No. 843,305. PATENTED FEB. 5, 1907.
A. A. SCHNEIDER.
TROLLEY WHEEL.
APPLICATION FILED APR. 30, 1906.

Witnesses
P. F. Nagle.
L. Donville.

Inventor
Adam A. Schneider,
By Diedersheim & Fairbanks,
Attorneys

UNITED STATES PATENT OFFICE.

ADAM A. SCHNEIDER, OF CAMDEN, NEW JERSEY.

TROLLEY-WHEEL.

No. 843,305.    Specification of Letters Patent.    Patented Feb. 5, 1907.

Application filed April 30, 1906. Serial No. 314,473.

*To all whom it may concern:*

Be it known that I, ADAM A. SCHNEIDER, a citizen of the United States, residing in the city and county of Camden, State of New Jersey, have invented a new and useful Trolley-Wheel, of which the following is a specification.

My invention relates to a new and useful trolley-wheel, and consists in providing a rotatable center with stationary side pieces, the whole being formed of the same shape and size as the trolley-wheel now in general use.

It further consists of other novel features of construction, all as will be hereinafter fully set forth.

Figure 1:
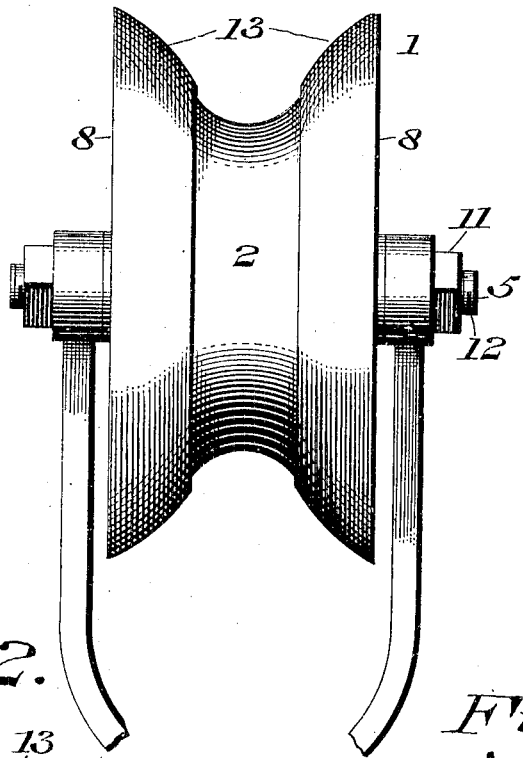
Figure 2:
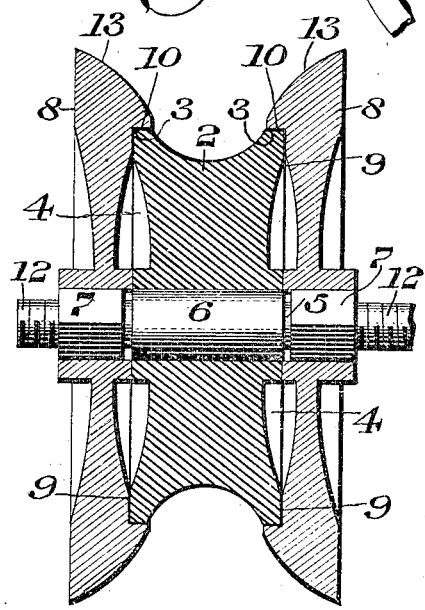
Figure 3:
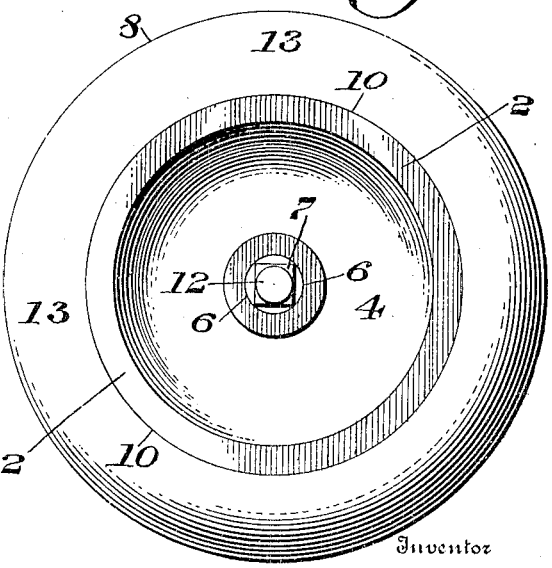

Figure 1 represents an elevation of a trolley-wheel embodying my invention. Fig. 2, represents a sectional view thereof. Fig. 3 represents a side elevation with one of the side pieces removed.

Similar numerals of reference indicate corresponding parts in the figures.

Referring to the drawings, 1 designates a trolley-wheel, which consists of the grooved center-piece or pulley 2, the same having rims 3 thereon and having the groove or channel 4 in each of its side faces.

5 designates a shaft or axis on which the wheel is mounted, a central portion thereof being round, as at 6, and upon which the center piece or pulley 2 rotates, said shaft being provided with the squared portions 7, upon which are mounted the stationary plates or disks 8, each of which latter is formed with a recess 9 upon its inner face, in which the central portion 2 is adapted to enter, it being noted that the shoulders 10, formed by the recess, closely fit the rims 3 on the pulley 2. Nuts 11 engage with the threaded ends 12 of the shafts in order to hold the parts in assembled position. The inner faces of the disks are curved, as at 13, from substantially the outer faces to the shoulders 10 in order to properly direct the trolley-wire to the rotating pulley.

It will be seen from the construction just described that by reason of the stationary disks 8 the wheel 1 is prevented from leaving the trolley-wire, and yet free rotation of the pulley 2 is permitted, with evident results.

The recesses or grooves 4, formed in the pulley, serve as a chamber for the reception of lubricating material, so that the parts are automatically lubricated and the pulley freely moves. The shaft 5 is supported upon the trolley-pole in any suitable or desired manner.

The stationary disks 8 8, embracing the pulley 2 as they do, serve to keep the same from wabbling, and the rims are confined within the curved inner faces, which latter merge into the groove of the pulley without shoulder or offset.

It will be evident that while I have described a certain construction for carrying out my invention I do not wish to be limited in every instance to that exactly described, but desire to make such changes as may come within the scope of my claims.

Having thus described my invention, what I claim as new, and desire to secure by Letters Patent, is—

1. A trolley-wheel comprising a shaft having a rounded portion and adapted to be supported adjacent its ends, disks non-rotatably mounted on the said shaft and each formed with a recess upon its inner face, the inner faces of said disks being curved toward each other, and a curved center piece rotatably mounted on said round portion of the shaft and having rims seated in the recesses of said disks and grooves on its side faces between said rims, said center piece being rotatable relative to the disks.

2. A trolley-wheel comprising a shaft with polygonal portions and an intermediate round portion and screw-threaded ends, disks non-rotatably mounted on said polygonal portions and each formed with a recess upon its inner face, the inner faces of said disks being curved toward each other, and a grooved center piece rotatably mounted on said round portion of the shaft and having rims engaged in the recesses of said disks, said center piece being rotatable relatively to the disks.

ADAM A. SCHNEIDER.

Witnesses:
JOHN A. WIEDERSHEIM,
C. D. McVAY.